United States Patent Office 3,227,314
Patented Jan. 4, 1966

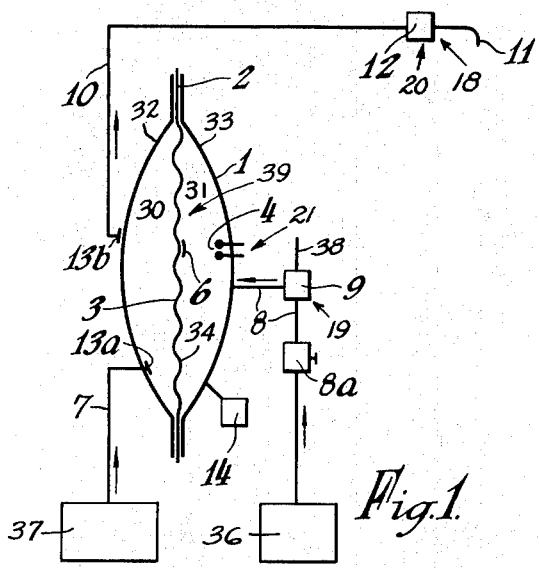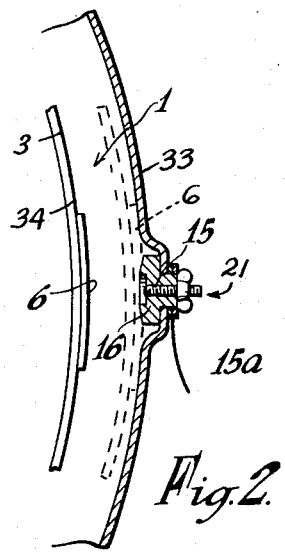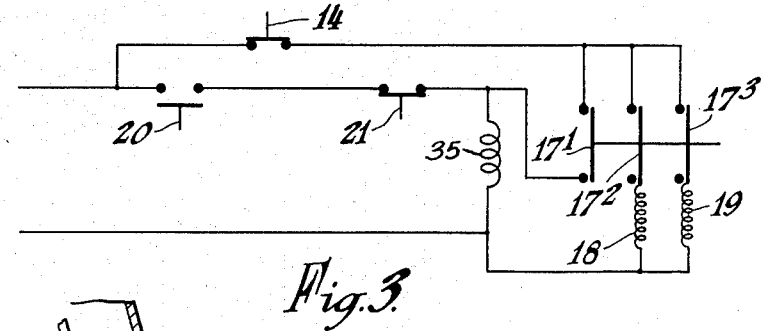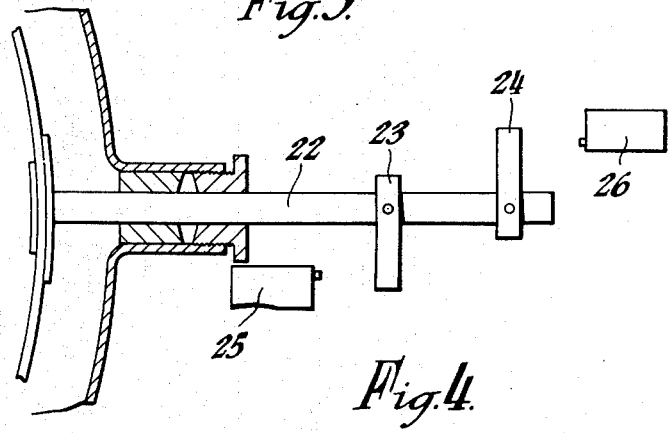
INVENTOR
THOMAS PORTER
BY THOMAS PORTER (JNR)
ATTORNEY

3,227,314
DELIVERING OF MEASURED QUANTITIES OF PRESSURISED LIQUIDS
Thomas Porter, Urmston, Manchester, and Thomas Porter, Jr., Flixton, Urmston, Manchester, England, assignors to Porter-Lancastrian Limited, Bolton, England
Filed Mar. 3, 1964, Ser. No. 349,032
2 Claims. (Cl. 222—61)

This invention is concerned with the delivery in measured quantities of pressurised liquids, in particular carbonated or otherwise gasified liquid and has as its main application the delivering of metered amounts of carbonated beverages, for example draught beer. The invention may be used also for the delivery of metered quantities of non-gasified liquids, including milk.

It is a common practice nowadays to store bulk beverage in a tank, usually in the basement of a building, with the interior of the tank subjected to a gas pressure for example from $CO_2$ bottles, or the like. Usually, also, such pressurised tanks are refrigerated so as to maintain the contents at a pre-determined pressure/temperature ratio, which inter alia determines the degree of $CO_2$ absorption by the liqiud.

However, if the dispenser at the bar is considerably higher than the storage tank, for example, on a second or even higher floor in the building, it has been necessary hitherto, in order to have a sufficient "head" to deliver the liquid at the bar, to increase the gas pressure in the interior of the tank. The drawback to this is that the increased gas pressure involves the absorption of undue amounts of $CO_2$ into the liquid so that, when the liquid is dispensed it froths excessively, which is a nuisance and interferes with accurate measurement.

In the known arrangements, in order to have a reasonable rate of flow when the liquid is being dispensed, conduits of relatively large bore have been used. If, however, there is a long line between the storage tank and the bar or other point of delivery, which means that there is always a large quantity of liquid in the pipe and, if the rate of dispensing is slow, say during a slack period at the bar, the liquid in the line becomes warmed, thereby partly or even wholly nullifying the refrigeration which took place in the tank.

The present invention has for its object to eliminate all these difficulties, and to make it possible to deliver metered quantities of a refrigerated beverage at any height above or below the storage tank, without any of the customary difficulties of frothing and loss of temperature.

According to this invention a metering pump is provided adjacent the tank, remotely controlled from the bar or other dispense point, the pump being of a type which at each operation will deliver a metered quantity at a pre-determined degree of gasification.

With such an arrangement therefore, since the pressure required to lift the beverage to the dispense point is provided by the pump itself, there is no necessity to incerase the gas pressure inside the tank, and no excessive absorption of $CO_2$ takes place. Furthermore, as the pressure of the pump is adequate to propel the liquid quickly, small bore pipes may be used between the pump and the dispense point, thus reducing the amount of static liquid in the pipeline between periods of dispensing.

The remote control of the pump and the control of the dispense tap may be effected by an suitable means, say electro-mechanical, hydraulic or pneumatic. In this last connection the control means may be operated by $CO_2$ branched off from the supply bottle which pressurises the bulk tank. In some cases instead of a common control operating the pump and the dispense tap, the opening of that tap may itself operate the pump.

The invention includes the further feature of a mutual interlock electrically actuated over any desired distance between the pump and the dispensing outlet, whereby on the one hand the pump cannot be stopped until the full measure has been dispensed and on the other hand the valve cannot be opened without the simultaneous operation of the pump.

The invention also provides an improved form of pump in which the liquid from the pressurised storage tank is fed under the storage pressure to a flexible-walled container in the pump, a gas under-pressure is provided for deflecting the flexible wall of such container in order to expel the contents of the said container, a control for such pressure gas is provided, and there is a normally-closed outlet from the said container, with an electro-magnetic circuitry or other inter-related control means between such outlet from the container and the control for said gas whereby, on the opening of the said outlet from the container the pressure gas is admitted to the flexible wall to deffect it, and the immediate deflection of such wall introduces a holding means whereby the expelling of the liquid continues until the liquid chamber of the pump is completely emptied, whereafter a stop means comprising a liquid chamber "empty" sensing device located in the gas chamber becomes operative to release the said holding means, to close the said outlet from the container and to relieve the flexible wall of the driving pressure. Thereupon the pressure in the storage tank refills the container, but re-opening of the outlet is not possible until the liquid chamber of the container is again completely filled and another stop means comprising a liquid chamber "full" sensing device in the gas chamber becomes operative to permit a new cycle. The liquid "full" stop means is operated by the movement of contacts moving with the diaphragm and the liquid "empty" stop means is operated by the build-up of pressure in the gas side of the pump.

There is non-return means of any suitable kind for preventing the liquid being driven back to the storage tank by the driving pressure, and further non-return means also of any suitable kind being provided for preventing any head of liquid refilling the pump when relieved of the driving pressure.

An optional feature of the invention is that when the said liquid full stop means is to be operated by build up of gas pressure the pressure gas is throttled down so as to provide in the flexible-walled container a differential between a lower pressure sufficient merely to deflect the wall and expel the contents of the pump, and a higher pressure sufficient to operate the control means. Such throttling means and the pressure-sensitive control means may be variable, independently or together, and they will usually be sealed against unauthorised variation after having been initially set for any particular case.

In this invention the pump is characterised by having a form of contact switch for said container wherein, in a rigid wall of the container, which forms part of a circuit, a contact is provided, insulated from such wall, but having an exposed interior face, and the flexible wall of the container carries a contact element adapted in one position of such wall to bridge over the insulation between the wall and the said contact. However in the invention disclosed and claimed in the co-pending application of Thomas Porter, Jr., Serial No. 348,977 filed March 3, 1964 and said contacts, and the said gas pressure sensitive stop means, are dispensed with and in their place there is attached to the diaphragm a short stud or spindle which, under the influence of diaphragm movements, slides in a cavity formed in or on the chamber wall and operates limit switches located in its path to effect the opening and closing of the control circuit. Such limit switches may be self-contained micro-switches of known form or they could take the form of a pair of slip rings in the wall of the said cavity, electrically insulated from each other, and the spindle is of a conducting material or carries a bush or sleeve of conducting material, the parts being so arranged that when the driving side of the pump is full and the measuring side empty the said spindle is out of contact with at least one of said slip rings so as to interrupt the control circuit but, when the reverse is the case and the measuring side of the pump is full, the driving side then being empty, the said spindle has been moved to a position where it reverses the switch condition and thereby provides the necessary electrical continuity in the control circuit.

The invention will now be described with reference to the accompanying diagrammatic drawing, in which;

FIG. 1 is a diagram showing one form of metering pump and its connections;

FIG. 2 is an enlarged diagram through the improved contact assembly;

FIG. 3 is an electrical diagram; and

FIG. 4 illustrates an alternative form of control means.

Referring first to FIG. 1, in a rigid container 1 the walls of which are separable at the flanges 2 for cleaning purposes, there is a diaphragm 3 of a size sufficient to lie against either of the interior faces of the wall of the container 1 when under pressure at one side or the other. The said wall, at the driving side, or gas chamber side, 31 of the container is provided with electrical contacts 4 and on the diaphragm 3 is a further contact 6.

On the driven side, or liquid chamber side, 30 of the diaphragm 3 is an inlet pipe 7 from a storage supply tank 37 and on the driving or gas chamber side 31 of the diaphragm is an inlet conduit 8 from a source of pressure gas 36, either compressed air, compressed nitrogen or the like, this conduit including a three-way control valve 9 which is coil actuated and provided with an exhaust 38. Also, on the beverage chamber 30 or driven side of the diaphragm is a discharge conduit 10 leading to a normally closed discharge outlet 11 of a coil actuated, dispense tap valve 12.

The arrangement is such that upon the operation of a control means the control valve 9 is automatically put into a position where pressure gas from the inlet conduit 8 passes into the driving, or gas chamber, side 31 of the chamber 39 of container 1 and also the tap valve 12 of the discharge outlet 11 is opened. The diaphragm 3 is now deflected by the gas pressure and expels the container contents at the other side of the diaphragm through the discharge conduit 10 to the now open tap valve 12. A non-return valve 13a is provided in the inlet conduit 7, and there is a non-return valve 13b in the inlet pipe 10 to hold any head of liquid there may be between the pump and the dispense outlet 11. Once this operation has started, no change can be made in the electrical circuit until the metering vessel is completely empty.

In the gas inlet conduit 8 is an adjustable needle valve 8a by which the rate of gas flow into the gas chamber side 31 of the container 1 is variable and by which, as the gas chamber side 31 of the container fills up and expels the liquid from the other side 30, the pressure in the driving side 31 of the container is lower than the pressure in the inlet conduit 8 at the inlet side of valve 8a. However, when the diaphragm is fully deflected against the wall 32 of the container, pressure builds up on the driving side 31 and eventually operates a normally-closed gas pressure-sensitive switch 14. This, as explained below, breaks the circuit, closes the tap outlet valve 12 and returns the three-way valve 9 to a position which exhausts the driving side 31 of the container 1, thereby allowing the pressure from the storage tank to refill the driven side 30 of the container 1. When the liquid chamber 30 is again completely full, contact is made at 4 and this brings the circuit back to its original condition.

Referring to FIG. 2 the side wall 33 of the gas chamber 31 has a plug 15 to which an electric lead 15a is connected, this plug being insulated from the wall 33 of the gas chamber 31 by an insulating washer and bushing 16 and, on the wall 34 of the flexible diaphragm 3 is the metal plate 6 which, when the diaphragm is completely distended to the right bridges the plug 15 and the wall 33 thereby making the circuit.

When the control circuit is at rest, with the liquid chamber full, switches 14 and 21 are closed and switch 20 is open, as shown in FIGURE 3, and the relay 17 has its contacts $17^1$, $17^2$ and $17^3$ open. Contact $17^1$ is a hold-on contact, contact $17^2$ and a coil 18 are in the circuit of the tap valve 12 for actuating the same and contact $17^3$ with coil 19 is in the circuit of the control valve 9 for actuating the same. Upon the operation of startswitch 20, which is located at the tap valve 12, or in a coin released means at the valve 12, the coil 35 of relay 17 is energized and relay 17 closes all its contacts, to cause coil 19 to open valve 9 to apply gas pressure and to cause coil 18 to hold valve 12 open. Switch 21 opens but switch 14 remains closed to maintain the circuit.

When the diaphragm 3 has been fully deflected to empty liquid chamber 30, gas pressure sensitive switch 14 is opened to de-energize coil 35, release the holding relay 17 and re-open all of its contacts $17^1$, $17^2$ and $17^3$. Valve 12 then closes and valve 9 moves to exhaust to permit the liquid chamber of the pump to refill. When the liquid chamber is again full of liquid, diaphragm 3 re-closes switch 21 in the gas chamber 31 by the bridging of conductive metal plate 6 across the insulator 16 to connect plug 15 and wall 33 as shown in dotted lines in FIGURE 2. Switch 14 re-closes due to reduced pressure in the exhaust cycle of the system.

In carrying out the invention two flexible walled devices could be coupled together to give a double-acting pump, the one diaphragm drawing in whilst the other expels the liquor, or two separate pumps could be used, operating in synchronism, one of them expelling the metered quantity of liquor whilst the other is being filled with the metered quantity.

Referring now to FIG. 4 an alternative is shown which dispenses with the contacts 6 and 15 and the pressure-sensitive switch 14. Instead the diaphragm 3 has attached to it a spindle 22 on which are two adjustable collars 23, 24 in the path of which are limit switches 25, 26. When the gas compartment is quite empty (and the liquor compartment full) one collar closes the switch 26 (equivalent of switch 21 of FIG. 3) and the other opens switch 25 (equivalent of switch 14 in FIG. 3). Instead of these switches, slip rings on the spindle and complemental contacts in their path could be used.

The pump or some part of the control means may be fitted with a counter so as to indicate how many times it is operated and therefore what total volume of liquor has been dispensed.

With a delivery means according to this invention the tank 37 for the bulk supply from which the delivery is taken may, if necessary, be at a higher level than the dispense point, the pump in this case also being adjacent the tank.

Despite the location of the dispense point 12, for example on an upper floor, and the location of the tank 37 and pump 1 for example in a building basement, the electrical interlock between the pump 1 and the dispense tap 12 makes it impossible for the operator to "fiddle" the delivery either by shutting off the supply before the metered amount is delivered or by starting a second delivery before the pump has re-filled following a first delivery.

What we claim is:

1. Apparatus for delivering measured quantities of pressurized beverages from a bulk storage vessel at one location to a dispense tap remote from said location said apparatus comprising:

a metering pump adjacent said vessel at said one location, said pump having a diaphragm dividing the pump into a beverage chamber and a gas chamber;

a beverage dispensing tap having a coil opened, normally closed valve and a normally open start switch;

conduit means, including one way valves, connecting said storage vessel to said beverage chamber and said beverage chamber to said dispense valve for unidirectional flow of said beverage to said tap;

gas pressure supply means adjacent said vessel at said one location including a source, a throttling valve and a coil actuated three way valve for supplying gas to said gas chamber and exhausting said chamber;

a normally open, diaphragm closed stop switch, in said gas chamber, for sensing the full distention of said diaphragm under the influence of beverage in said beverage chamber;

a normally closed, gas pressure opened switch in said gas chamber, for sensing a predetermined gas pressure therein sufficient to fully distend said diaphragm to empty said beverage chamber, and an electric control circuit including a source of current, the coils of said valves, said start switch, said diaphragm closed switch, said gas pressure opened switch and a holding relay;

the closing of said start switch causing said dispense valve to remain open until said gas pressure switch indicates an empty beverage chamber and said dispense valve not being re-openable until said diaphragm closed switch indicates a completely refilled beverage chamber.

2. Apparatus for delivering measured quantities of beer to a dispense tap said apparatus comprising:

a metering pump having a diaphragm dividing the same into a beverage chamber and a gas chamber;

conduit means connecting said beverage chamber to said dispense tap;

gas pressure means, including a pressure control valve, for supplying gas under pressure to said gas chamber;

a diaphragm actuated electric switch and a gas pressure actuated electric switch within said gas pressure chamber for respectively sensing the beverage full and beverage empty condition of said pump, and electric control circuit means including said switches, a coil actuating said dispense valve, a coil actuating said gas control valve and a holding relay whereby said tap and pump are mutually interlocked, by electric circuitry to permit said tap to be at any desired distance from said pump.

References Cited by the Examiner
UNITED STATES PATENTS 2,819,679 1/1958 Wilson _____ 222—249 X
2,824,585 2/1958 Andres _____ 222—250

FOREIGN PATENTS 945,469 5/1949 France.
1,077,943 11/1954 France.

RAPHAEL M. LUPO, *Primary Examiner.*

HADD S. LANE, *Examiner.*